(12) United States Patent
May

(10) Patent No.: US 6,871,555 B2
(45) Date of Patent: Mar. 29, 2005

(54) MAGNETIC TRANSDUCER ELEMENT AND METHOD OF PREPARATION

(75) Inventor: Lutz Axel May, Gelting (DE)

(73) Assignee: Abas, Inc., Chicago, IL (US)

( * ) Notice: Subject to any disclaimer, the term of this patent is extended or adjusted under 35 U.S.C. 154(b) by 0 days.

(21) Appl. No.: 10/257,337

(22) PCT Filed: Apr. 10, 2001

(86) PCT No.: PCT/EP01/04077

§ 371 (c)(1),
(2), (4) Date: Feb. 12, 2003

(87) PCT Pub. No.: WO01/79801

PCT Pub. Date: Oct. 25, 2001

(65) Prior Publication Data

US 2003/0150282 A1 Aug. 14, 2003

(51) Int. Cl.⁷ ................................................. G01L 3/02
(52) U.S. Cl. ................................................. 73/862.333
(58) Field of Search .................. 73/862.331, 862.332, 73/862.333, 862.334, 862.335, 862.336

(56) References Cited

U.S. PATENT DOCUMENTS

| 5,708,216 | A | * | 1/1998 | Garshelis | ................ | 73/862.335 |
| 6,047,605 | A | | 4/2000 | Garshelis | ................ | 73/862.336 |
| 6,145,387 | A | | 11/2000 | Garshelis | ................ | 73/862.336 |
| 6,260,423 | B1 | | 7/2001 | Garshelis | ................ | 73/862.336 |
| 6,330,833 | B1 | * | 12/2001 | Opie et al. | ............. | 73/862.333 |
| 6,581,480 | B1 | * | 6/2003 | May et al. | ............. | 73/862.333 |
| 6,698,299 | B2 | * | 3/2004 | Cripe | ..................... | 73/862.331 |

FOREIGN PATENT DOCUMENTS

| DE | 34 37 379.9 | 10/1984 |
| JP | 59-184505 | 10/1984 |
| JP | 59-192930 | 11/1984 |
| JP | 61-115312 | 6/1986 |
| WO | WO 99/56099 | 11/1999 |

* cited by examiner

*Primary Examiner*—Max Noori
(74) *Attorney, Agent, or Firm*—Blank Rome LLP

(57) ABSTRACT

A magnetic transducer element is formed in a portion (22) of a shaft (20) by an axially-oriented magnetic source (30) comprising a U-shape permanent magnet or electromagnet assembly, the gap (g) between the poles of which is small compared to the pole width (w). The source (30) is brought up to the continually rotating shaft (20) from a distance ($D_1$) to a position closely proximate ($D_2$) the shaft (20) and then retracting the source (30). With an electromagnet the mechanical movement may be emulated by controlling the energising of the electromagnet. An annular, surface-adjacent zone of axially-directed magnetisation is created whose external detectable field (40) has a distribution in the axial direction which shifts axially under applied torque. An axial or radial component may be sensed as a measure of torque. A method of preparing the shaft for magnetisation (magnetic-cleansing) and a post-magnetisation procedure is disclosed.

19 Claims, 12 Drawing Sheets

FIG. 3c  $M_s \downarrow$   $\rightarrow M_f$  $\rightarrow M_f'$

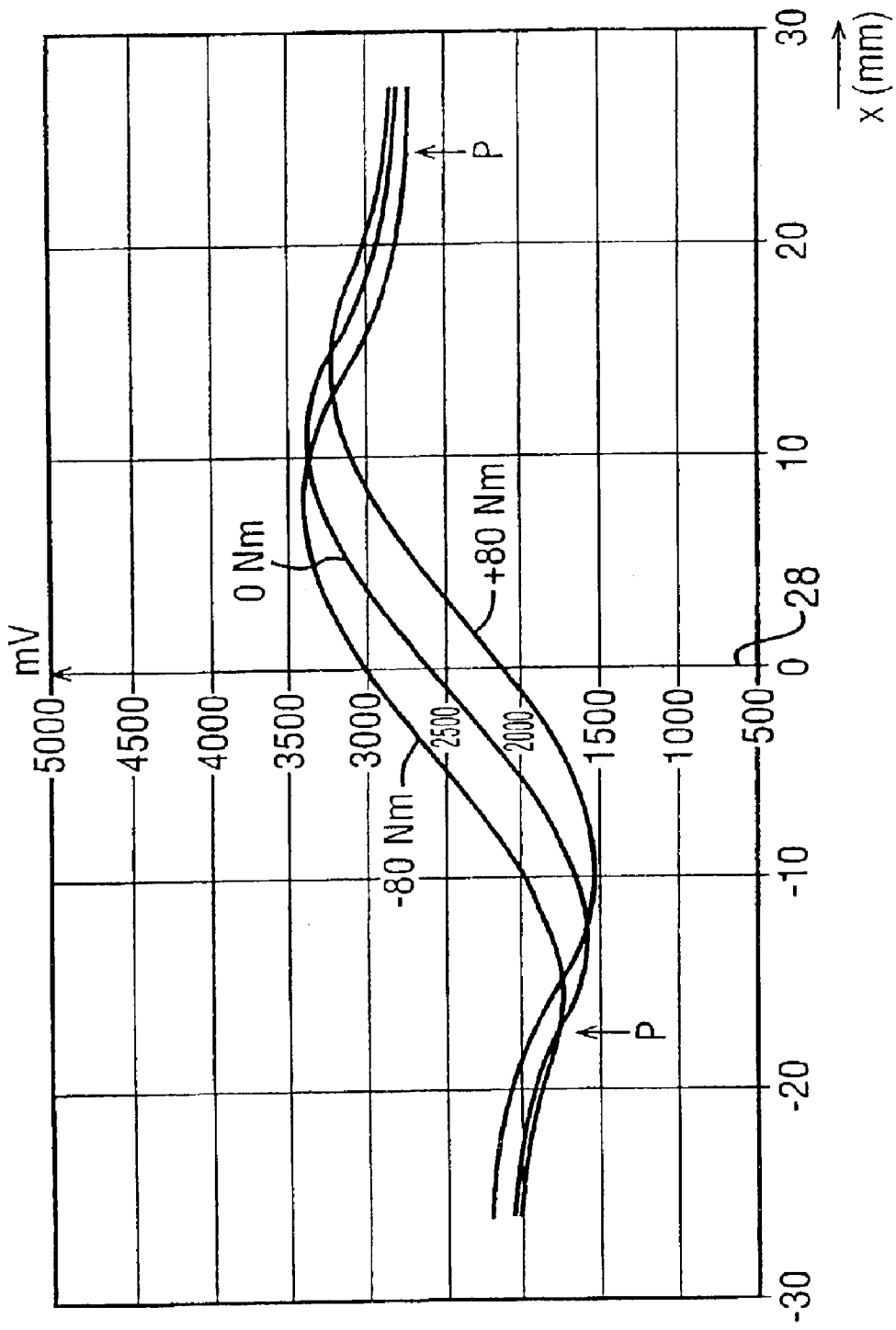

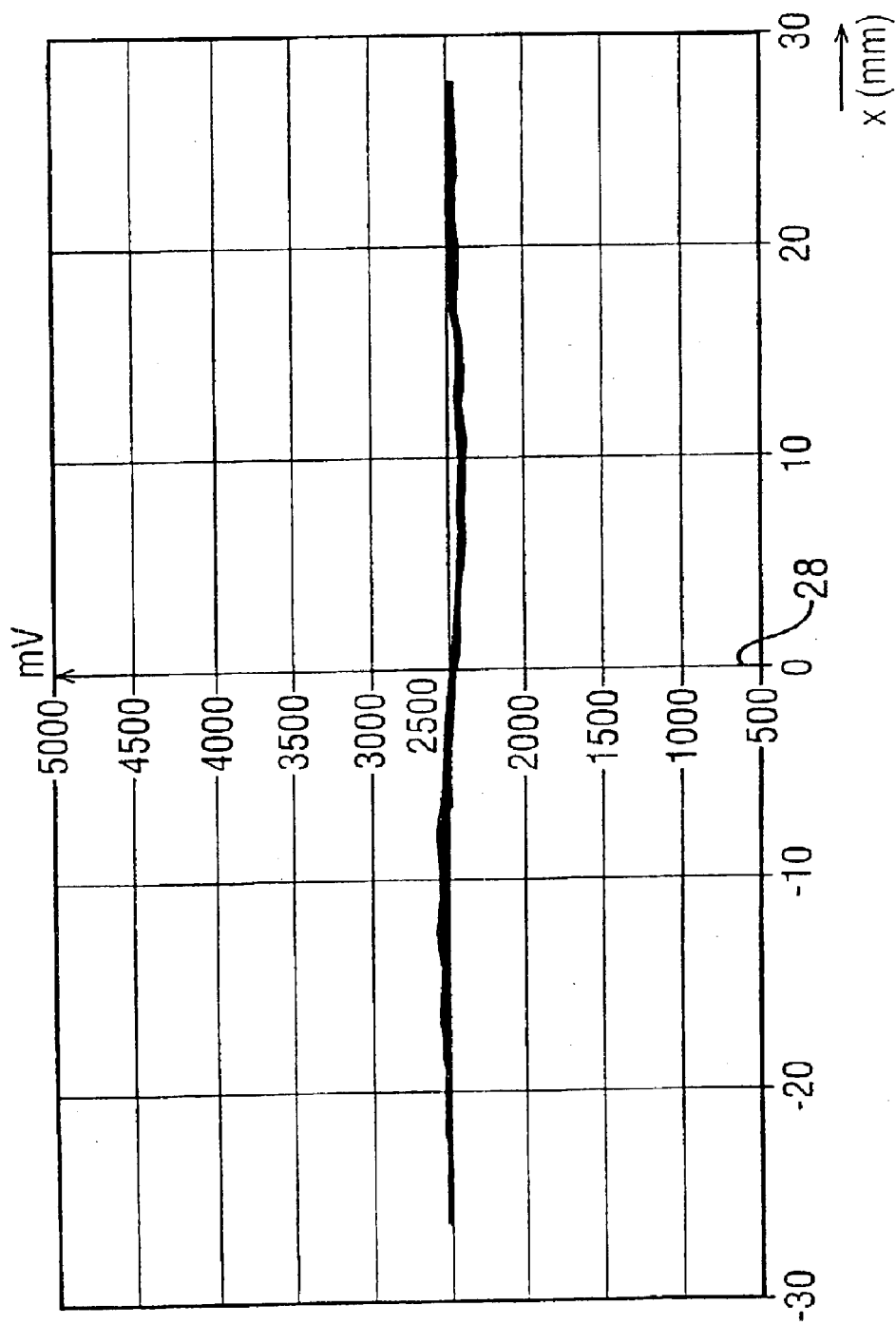

MAGNETIC TRANSDUCER ELEMENT AND METHOD OF PREPARATION

FIELD OF THE INVENTION

This invention relates to a torque or force magnetic transducer element and to a transducer arrangement or system incorporating such an element. The invention further relates to a method of preparation of a magnetisable member, such as a putative transducer element, for magnetisation and to a method of magnetising a portion of the member so prepared.

The invention will be particularly discussed and described in relation to the measurement of torque, and more particularly torque applied to a shaft in which the transducer element is an integral portion of the shaft. The shaft is assumed to be of ferromagnetic material. The material is preferably chosen to be a hard magnetic material capable of achieving a high saturation and remanence and having a high coercivity.

BACKGROUND OF THE INVENTION

There have been previous proposals for a transducer element to be integrally formed in a portion of a ferromagnetic shaft subject to torque about its lengthwise axis. One previous proposal is disclosed in PCT application PCT/GB00/03119 published under the number WO00/13081 is to longitudinally magnetise the shaft portion so as to create a torus of axially-directed magnetisation. Torque is sensed by detecting a tangentially or circumferentially-directed component of magnetic field, which component is torque dependent. In order to assist an understanding of the present invention, there will first be outlined an implementation of the previous proposal with reference to FIGS. 1–3c of the accompanying drawings.

FIG. 1 shows how an annulus of longitudinal magnetisation is applied to an integral portion of a shaft. The portion is to provide a transducer element and it at least is of magnetic material. In FIG. 1 a shaft 10 of magnetic material is rotated magnetic material is rotated about its axis so that a portion 12 of it is magnetised by the axially-spaced north-south poles NS of a magnet arrangement 14. This may be conveniently an electromagnetic which enables the magnetisation to be readily controlled. The magnet system may be moved about the shaft. The result of this magnetisation is to produce an annular zone of surface magnetisation 16 as shown in FIG. 2a having NS poles as indicated. It extends as an annulus about the shaft axis having the remanent magnetisation of the same polarity around the axis of the shaft and axially-directed. As indicated, the annular magnetisation tends to form a closed flux path within the shaft interior to annulus 16 so that a toroid of magnetic flux is established about the shaft axis. What is important is the magnetic field detectable exteriorly of the shaft as will be shortly explained.

The toroidal flux concept can be enhanced as is shown in FIG. 2b which shows a surface adjacent annular magnetised zone 16 within which an interior annular magnetised zone 18 of opposite polarity is established.

The two zones combine as shown to provide the torus of closed loop magnetic flux. The magnetisation is obtained by a two-step procedure. Firstly a deeper annular region of the polarity of zone 18 is formed by the magnet 14. Then the surface adjacent zone 16 is formed by reversing the magnetisation polarity of the surface adjacent region of the deeper region.

Turning to the practical utilisation of the resultant transducer element, reference is made to FIG. 3a which shows the magnetic field of zone 16 as seen at the surface of the shaft in the absence of torque. The arrow Mf indicates a fringing field which will extend generally in the axial direction between the poles of region 16 in the ambient medium, usually air.

FIG. 3b shows the effect of putting the shaft, and thus transducer element portion 12, under torque in one direction about the axis A—A of shaft 10. The longitudinal field in zone 16 is skewed as shown by the arrows (the skew is exaggerated for clarity of illustration). The external fringing field is likewise skewed or deflected as represented by magnetic vector Mf FIG. 3c). Also generated is a vector component Ms which in this embodiment extends circumferentially about the circumference of shaft 110. The component Ms is tangential to the shaft at any point, that is perpendicular to the local radius. It is the Ms component that provides the component for measuring torque by means of an appropriately oriented magnetic field sensor or group of sensors Ms is a function of torque. If the torque is in the opposite direction the direction of Ms is reversed. At zero torque, Ms has a zero value.

SUMMARY OF THE PRESENT INVENTION

The present invention is also based on a development of the lengthwise or axially-directed magnetisation of a portion of a magnetisable shaft. However, in the transducer element of the present invention the torque-dependent external field emanated by the transducer element has axial and radial components which are axially-shifted as a function of torque. This will be described subsequently and is a surprising result. More surprisingly in tests performed on a transducer element produced by the magnetisation process of the present invention, it has been found that there is no detectable circumferential or tangential component Ms: or at least any such component is so weak as to be lost in noise.

The creation of a transducer element of the invention having the above field distribution characteristics is described below. The magnetisation of the element is also accomplished by relative rotation about an axis of a shaft in a magnet system generally as illustrated in FIG. 1. A greater depth of magnetisation is obtained by using a magnet system comprising permanent magnets forming a horseshoe magnet using stronger magnets than were used previously. More particularly the magnet poles adjacent the shaft have been relatively wide in the axial direction as compared to their thickness in the circumferential direction.

The processing for creating the transducer element in a shaft falls broadly into two operations with a third operation that may follow: a magnetic preparation which may be referred to for brevity as de-gaussing or magnetic cleansing; and thereafter a magnetisation procedure. The magnetic preparation may be preceded by pre-treatment of the shaft which may include mechanical operations on it. The magnetic preparation is considered to be new and inventive in its own right and may be applied generally to shafts or other objects requiring a magnetic field to be established in them for use as a transducer element. The magnetic preparation (pre-magnetisation) procedure to be described can be summarised as providing a magnetically cleansed part in which the desired magnetic field is then established. The magnetisation operation may be followed by a post magnetisation procedure somewhat similar to the pre-magnetisation procedure.

Aspects and features of the present invention for which protection is presently sought are set forth in the claims following this description.

One aspect of the invention is a magnetic transducer element as set forth in claim 1. Another aspect of the invention is a magnetic transducer element as set forth in claim 8. A further aspect of the invention is a transducer arrangement comprising a magnetic transducer element and at least one magnetic field sensor as set forth in claim 14. Yet other aspects of the invention lie in a method of preparing a magnetisable member for magnetisation as set forth in claim 20 and a method of magnetising a portion of a member as set forth in claim 23.

BRIEF DESCRIPTION OF THE DRAWINGS

FIG. 3c is a magnetic vector diagram pertaining to the torqued state;

FIG. 11 is a radial field magnetic profile;

FIG. 12 is a circumferential field magnetic profile;

DESCRIPTION OF A PREFERRED EMBODIMENT

The invention will be particularly described with reference to the magnetisation of a portion of a shaft to form a transducer element. The body or part in which the desired magnetisation is to be established may be more generally referred to as the sensor host. The section which next follows relates to the magnetisation of a magnetically clean sensor host. The magnetic preparation (pre-magnetisation) of the sensor host, specifically the shaft, is described subsequently as is the post-magnetisation procedure. The resultant transducer element is discussed in the context of non-contact sensing of a rotating shaft.

The Magnetising Assembly

Figure 1:
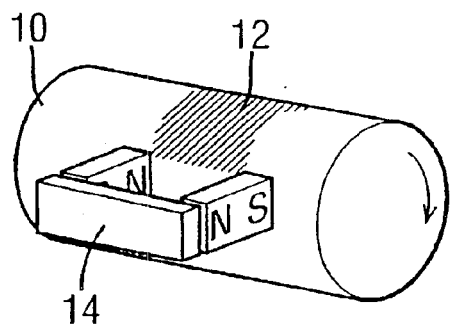
FIG. 1 shows a magnetisation procedure for longitudinal magnetisation of a portion of a shaft according to a prior proposal.
Figure 2A:
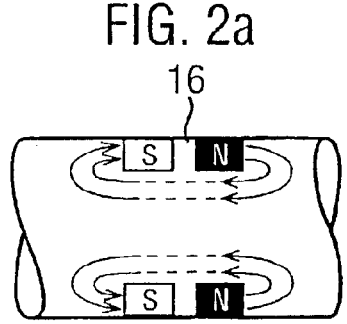
FIGS. 2a and 2b illustrate the form of the magnetic field established in the shaft portion of FIG. 1 according to a single-step or two-step magnetisation procedure respectively.
Figure 2B:
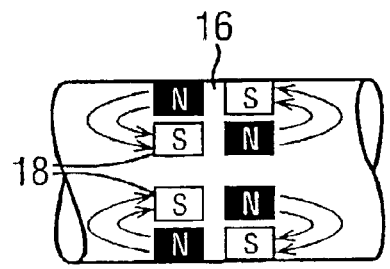
Figure 3A:
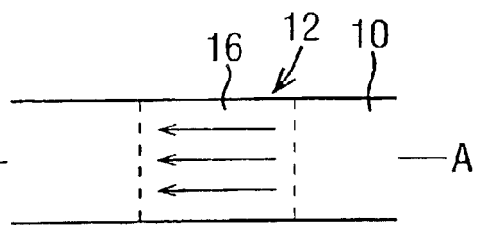
FIGS. 3a and 3b illustrate the longitudinal magnetisation according to FIGS. 1, 2a and 2b in the quiescent and torque state respectively.
Figure 3B:
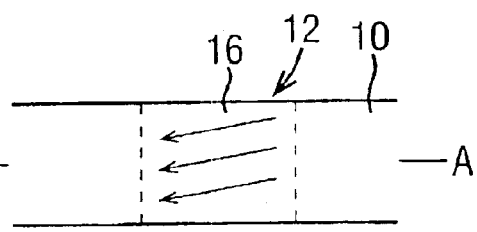
Figure 4:
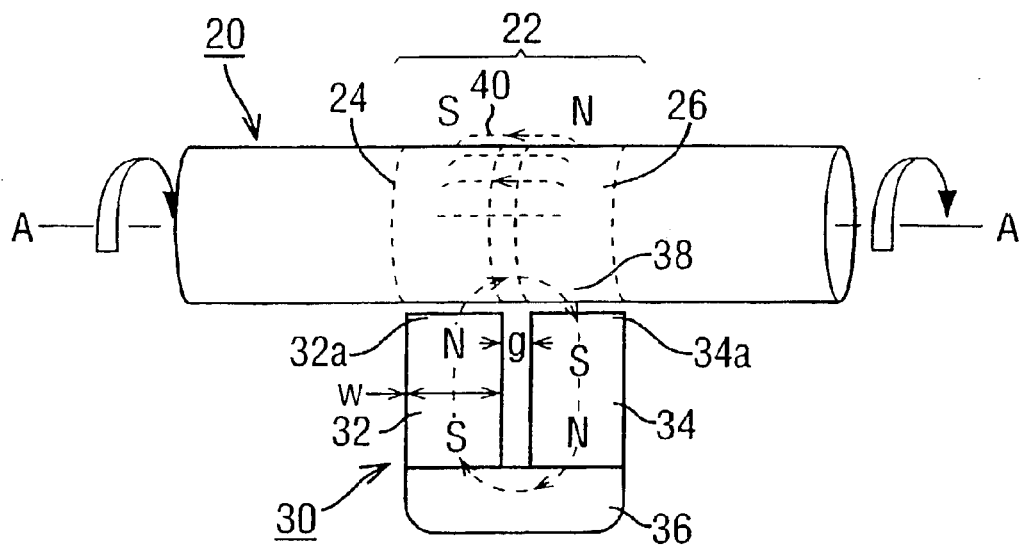
FIG. 4 shows a shaft having an integral portion thereof being magnetised in accordance with the present invention.
Figure 5:
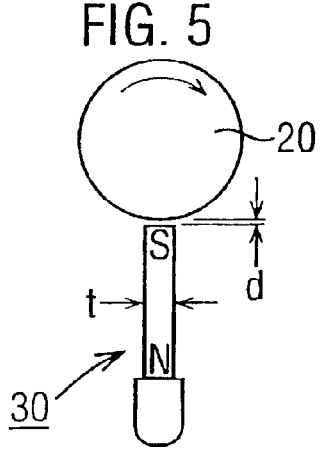
FIG. 5 is an end view of the shaft and magnet assembly of FIG. 1.

FIG. 4 shows a magnetically-cleansed shaft 20 of circular cross-section subjectable to torque applied about its axis A—A. The shaft 20 may be mounted for rotation about axis A—A. The shaft has a solid cross-section. The direction of rotation is clockwise (cw) as referred to the shaft as seen from its right-hand end in the figure. FIG. 5 is a view from the right of FIG. 4. Mounted closely adjacent the circumference of a portion 22 of the shaft is a magnetic source 30 which comprises a magnet assembly with a pair of powerful magnets 32, 34 arranged radially lengthwise (in their NS direction) with respect to the shaft surface with opposite polarity. Their remote poles are connected by a flux concentrator 36 forming a low reluctance bridge between the magnets to assist in generating or concentrating the magnetic flux 38 from the opposite pole pieces or ends 32a, 34a entering the adjacent zone of portion 22 in order to magnetise it. The magnet assembly 30 thus provides a U-shape or horseshoe magnet acting in a radial plane. It is constructed in separate parts in order to make use of very powerful permanent magnets 32 and 34. The field strength achieved between the magnet poles and the sensor surface is greater than 4 kGauss and preferably in excess of 5 kGauss. This requires a minimal spacing between the magnets and the surface as will be discussed.

As can be seen from. FIGS. 4 and 5, the magnets 32, 34 are aligned in the axial direction and the shaft 20 is rotated about axis A—A with respect to the magnets to induce South and North poles 24 and 26 in an annular zone about axis A—A of portion 22. The magnetisation extends around the circumference of the shaft inwardly from the surface of the shaft. The depth of the magnetisation achieved in portion 22is also important as will be discussed below. Portion 22 provides a transducer element responsive to torque applied about the axis A—A of shaft 20 In FIGS. 4 and 5 the shaft is shown as is rotating with respect to magnet assembly 30 but it will be understood that the desired relative rotation can be achieved by rotating the magnet assembly about the shaft or a combination of the two.

In the magnet assembly shown and used for the magnetised shaft, tests on which are reported below, the axial width w of each pole piece 32a, 34a (and of each magnet 32, 34) is substantially greater than the thickness t in the circumferential direction. Furthermore the gap g between the pole pieces 32a, 34a is also substantially less than the width w.

Figure 7:
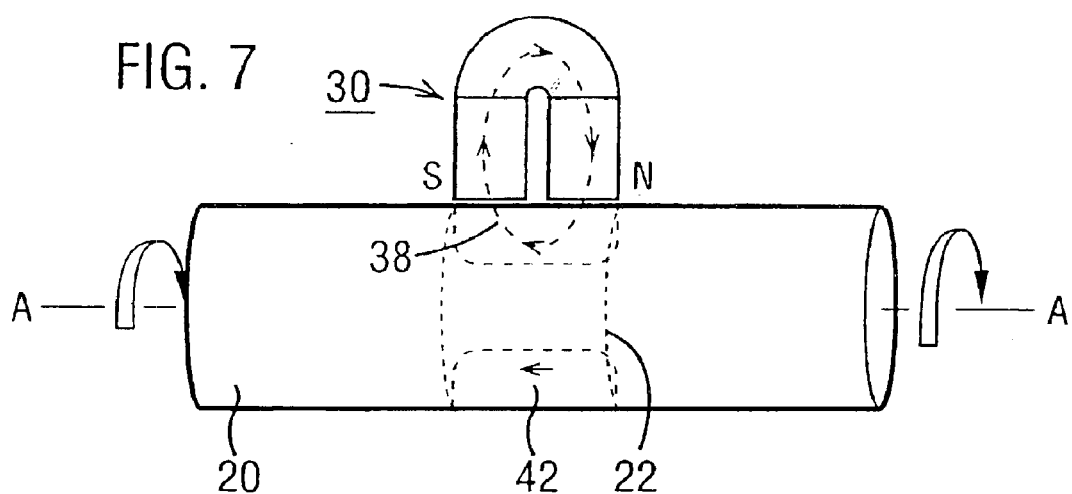
FIG. 7 is a diagrammatic representation of the magnetisation procedure.

By way of example, the nature of the externally-detectable magnetic field to be described more fully below was achieved by magnetisation performed on a shaft of 18 mm. diameter consisting of a high performance FV520B steel. Each magnet 32, 34 had a width w of 15 mm. and a thickness t of 4 mm. The gap g utilised was 2 mm. In the magnetisation process, the spacing d between the pole pieces 32a, 34a and the shaft surface was kept as far as possible below 2 mm. Increasing the gap will reduce signal gain (slope) and signal linearity. Signal gain is further discussed below. The magnetisation procedure seeks to magnetise the portion 22 to saturation to a depth such as indicated in FIG. 7 (annulus 42). Also diagrammatically shown in FIG. 4 is the magnetic flux 40 that is emanated exteriorly of the shaft portion 22 between the North and South poles 24 and 26. It is this exterior flux and its behaviour under torque which has yielded the surprising results to be described.

The Magnetising Procedure

More detail will now be given with reference to FIGS. 6a–6c of the magnetising procedure or magnetic programming as it may also be called. In practice the movements and their timing will be effected by means of an appropriately constructed machine. The magnetic source or magnetic programming unit (MPU) will be assumed to be the single horseshoe assembly 30 already described. Again it is assumed that the shaft to be magnetised has been magnetically cleansed.

Figure 6A:
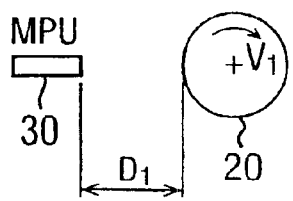
FIGS. 6 to 6c illustrate steps in the magnetisation procedure for the shaft using the magnet assembly shown in FIGS. 4 and 5.
Figure 6B:
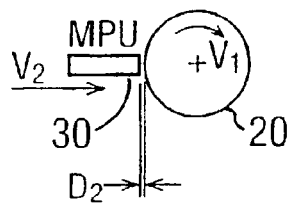
Figure 6C:
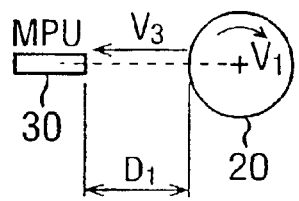

In FIGS. 6a–6c, MPU 30 is shown in a sequence of steps 1), 2) and 3) in which it is moved along a radially-directed axis toward the rotating shaft 20 from a neutral or non-active position (FIG. 6a) to a fully magnetically engaged position (FIG. 6b) and then back to a neutral position (FIG. 6c). The distance $D_1$ is the spacing between the MPU 30 and the shaft surface in the neutral position while $D_2$ is the minimum spacing (d in FIG. 5) in the fully magnetically engaged position. The shaft rotates at an angular velocity $V_1$. The linear speed with which the MPU 30 moves forward toward the shaft 10 is $V_2$, while the speed of retraction from the shaft is $V_3$.

The environment in which the magnetisation procedure is performed should be as free as possible from the generation of magnetic fields that could influence the programming of shaft 20 with the desired magnetic field. In particular any means by which the MPU 30 is moved should be designed to avoid setting up unwanted fields in the vicinity of the shaft. Magnetisation proceeds as follows:

Step 1) (FIG. 6a): While MPU (30) is located in its non-active position at distance D1 from the shaft 10, the shaft commences rotation at an angular velocity $V_1$ which is maintained constant throughout the procedure. D1 is sufficient that any magnetic flux directly or indirectly from the MPU will not have any permanent effect on the shaft host.

The rotational speed $V_1$ is not critical but as stated it is important to keep it constant through the entire magnetisation procedure. In general $V_1$ may lie in the range 10–3000 rpm. One factor to be taken into account in setting the value of $V_1$ is a parameter called zero-torque offset. This is discussed further below.

Step 2) (FIG. 6b): Having established rotation of the sensor host at $V_1$, the MPU 30 is then moved toward the shaft 10 at relatively slow speed $V_2$. The value of $V_2$ is partially dependent on $V_1$. At higher values of $V_1$, $V_2$ can be increased. Typically at $V_1$=2800 rpm, $V_2$ can be 1 to 2 mm/sec. It is generally desirable to move the MPU as close to the shaft surface as possible consistent with avoiding the permanent magnets contacting the surface, i.e. the fully magnetically engaged position—see also FIG. 7. Contact may modulate the rotational speed of the shaft or the movement of a control mechanism guiding the MPU. The distance $D_2$ between the MPU and the surface of the sensor host should not only be made as small as possible but should be maintained constant to a high degree of accuracy. To this end a feedback control means for sensing the position of the MPU 30 with respect to the surface of the sensor host can be employed so as to achieve the desired control.

The MPU is maintained in the fully magnetically engaged position for a number of rotations to achieve saturation magnetisation of the portion 22 of the shaft. It is presently preferred that the depth of magnetisation be more than 30% of the radius of the shaft but going beyond a depth of 60% may reduce the sensor performance.

Step 3) (FIG. 6c); While still maintaining shaft rotation at $V_1$, the MPU is retracted or withdrawn from the fully magnetically engaged position to the neutral position at a speed $V_3$ directly related to $V_1$. Once back in the neutral position the rotation of the shaft is stopped and the shaft can be removed. The shaft should now have a well-defined magnetisation of the portion 22 as indicated in FIG. 4. The nature of this magnetisation is further described with reference to FIGS. 7, and 8a to 8c. $V_3$ would normally be substantially less than the forward advance speed $V_2$. For a value of 2800 rpm, a value of $V_2$ of 1–2 mm/sec has been mentioned: a value of $V_3$ of 0–5 mm/sec or less would be appropriate for retraction, preferably 0.25 mm/sec or even less. The retraction should not engender any disturbance of the desired magnetisation established in Step 2).

Step 4) (optional): The magnetised shaft may be subjected to a post-magnetisation stage which is similar to but carried out at a lower level than the pre-magnetisation cleansing description below.

Before moving on to FIGS. 7 and 8a–8c, the concept of zero-force offset will be explained. This was mentioned in Step 1 with reference to the choice of rotational velocity $V_1$.

Start with the situation in which the shaft is magnetised as described above under zero or near-zero torque in the shaft. As will become more apparent from the response graphs discussed below, when the magnetised portion is used as a torque transducer element, it provides a magnetic field output which a) is a function of torque, b) has a polarity that is dependent on the direction of torque, clockwise (cw) or counter-clockwise (ccw), and c) has an essentially zero value at zero torque. However, if the magnetisation procedure is performed while the shaft is under torque, that will be the torque at which the output signal passes through zero. On relaxing the shaft to zero torque a non-zero quiescent output is obtained. The polarity of the quiescent output depends on the direction of the torque applied in magnetisation. The phenomenon can be put to practical effect in a technique known as pre-torquing disclosed in PCT application PCT/GB00/01103 published under the number WO00/57150 on 28th Sep. 2000.

Figure 24:
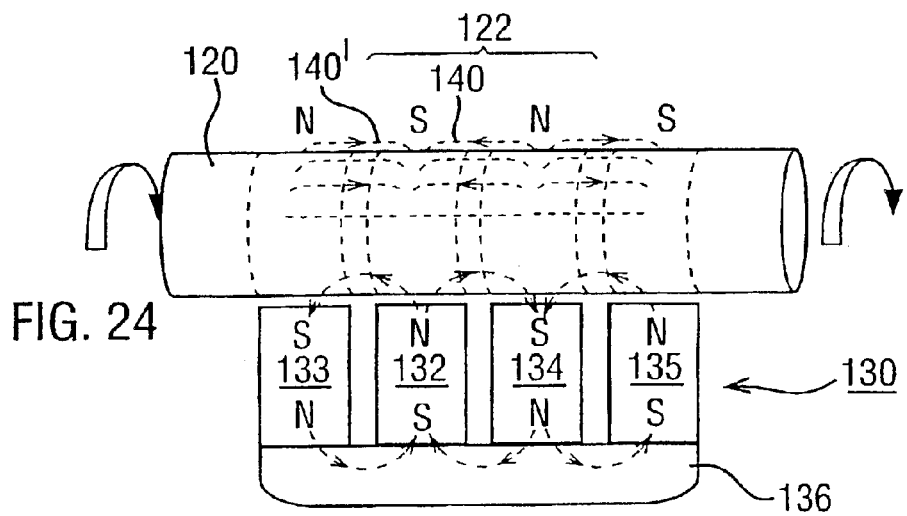
FIG. 24 shows a magnetisation system and process to provide guard/keep fields.

The magnetisation procedure described above may be applied to form multiple transducer elements along the shaft sequentially or simultaneously with an appropriate number of MPUs). The elements may be given different polarities and, if required, be pre-torqued. Present practice indicates a preference for magnetising different axial portions of the shaft pertaining to different transducer elements simultaneously. This lessens the possibility of the strong field used for magnetising a subsequent portion affecting a previously magnetised portion. Multiple magnetised portions can also be employed where a transducer element portion is flanked by guard or keeper portions each of opposite polarity of magnetisation to the transducer portion (FIG. 24).

FIG. 7 is a side view of the rotating shaft showing the magnetisation of portion 22 during step 2) of FIG. 6b. the MPU 30 is in the fully engaged position and the generated flux 38 magnetises an annular region 42. The magnetisation in this region is axially-directed.

The nature of the deep axially-directed magnetisation achieved with the above procedure will be more fully described with reference to FIGS. 8a–8d.

Figure 8A:
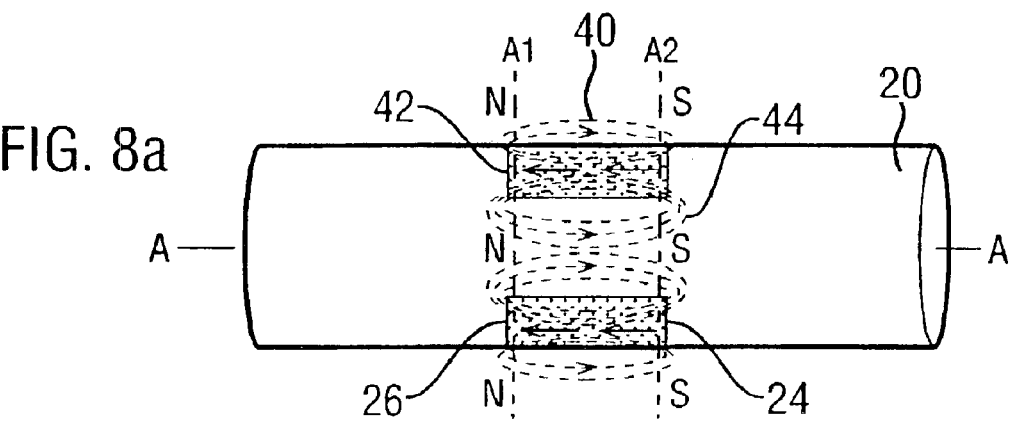
FIG. 8a is an illustration of the magnetic flux established in the transducer element in a shaft, FIGS. 8b and 8c being sections on the lines A1 and A2 respectively, and FIG. 8d a further illustration of the transducer field.

FIG. 8a shows an axial cross-section of a shaft 20 having a portion 22 magnetised by the steps described above to provide the annular region 42 (shown shaded) having North and South poles 26 and 24. The poles are, of course, not as clearly delimited as the drawing shows for clarity of illustration.

Figure 8B:
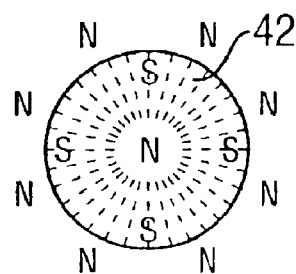
Figure 8C:
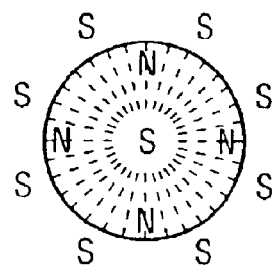
Figure 8D:
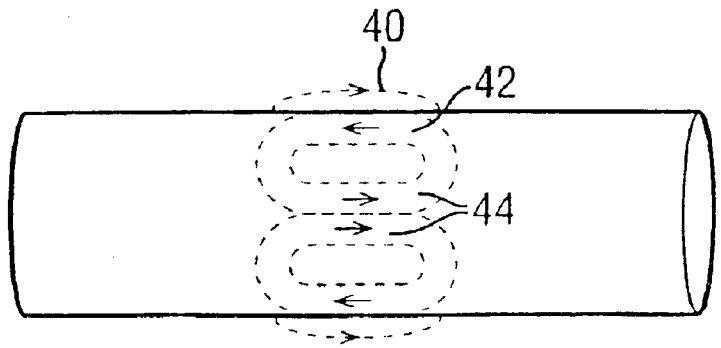

FIGS. 8b and 8c are radial cross-sections taken on A1 and A2 respectively in FIG. 8a The cross-sections are drawn to indicate the flux polarity as seen looking towards portion 22 from the outside. Thus FIG. 8b shows the internal flux of region 42 directed (S) toward the North pole of the region while FIG. 8c shows the internal flux directed (N) away from the South pole of region 42. The annular magnetised region forms a closed magnetic loop 44 interiorly of the region and a lesser external loop 40 is established outside the shaft. Both loops will be of toroidal form about shaft axis A—A.

Figure 10:
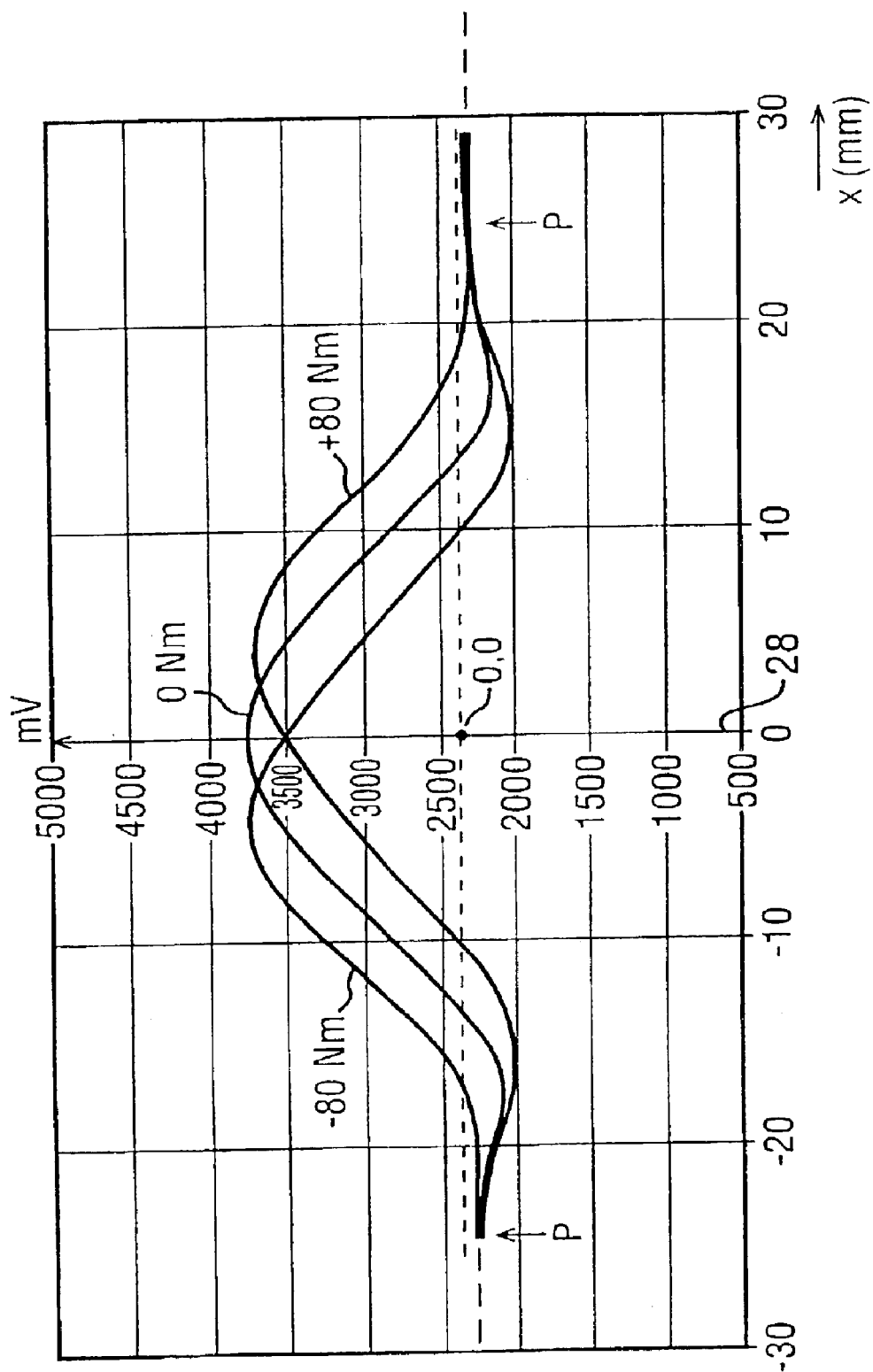
FIG. 10 is an axial field magnetic profile.

Experiments have shown that the inner surface of the loop 44 becomes of essentially zero or near zero radius. This is indicated by the polarities shown at the centre of each of FIGS. 8b and 8c and is further diagrammatically illustrated by the flux distribution of FIG. 8d. This enhanced magnetisation flux distribution through the axial core of shaft 20 is a function of the radial depth of the region 42. As already mentioned, this region Us magnetised to saturation. The experimental results reported below with reference to FIGS. 10, 11 and 12 are for a shaft 10 magnetised in accord with the steps above described to have the kind of flux distribution just described. It will be appreciated by those skilled in the art that the determination of flux distribution within solid magnetised objects is not easy. In the investigations we have performed probes have been inserted in fine axially-directed bores within the shaft.

For practical torque measurement purposes, the field distribution used is that of the external field 40. The practical consequences of producing a transducer element by means of the magnetisation procedure described above are surprising and unexpected.

External Magnetic Field Profiles

There will now be described the measurement of magnetic field profiles made with a shaft having a portion magnetised in accord with the magnetisation procedure described and bounded axially by non-magnetic portions, which like the magnetised portion were previously magnetically cleansed in the manner to be described. That is the whole shaft was cleansed in the manner to be described.

Figure 9A:
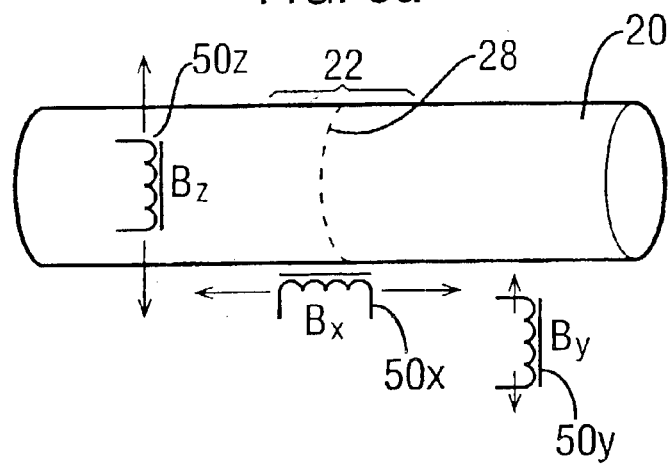
FIGS. 9a and 9b show sensor orientations for obtaining axial, radial and tangential magnetic profiles all to be taken as a function of axial position.
Figure 9B:
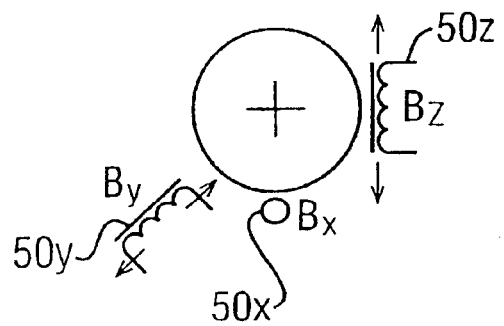

FIGS. 9a and 9b illustrate the three orientations of sensors B by which external field distribution is investigated. FIG. 9a shows a shaft 20 having a magnetised portion 22 as above described the centre of which in the axial direction is taken to be at radial plane 28. Three different magnetic profiles were measured using directional sensors oriented in the manner shown in FIGS. 9a and 9b. The sensors used were of the saturating inductor type such as described in PCT publication WO98/52063 in which the field sensitive inductor is typically a few millimetres in length. Other sensor devices commonly used for measuring magnetic fields are Hall effect sensors, the field sensitive element of which is very much smaller, and directional magnetoresistive sensors. All these sensors have a figure-of-eight response pattern with a broad angle of near maximum response and sharper nulls perpendicular to the axis of maximum response.

Three sets of measurements were performed using three different sensor orientations with respect to the shaft 10 as represented by inductors 50x, 50y, 50z in FIGS. 9a and 9b. All measurements were made with the relevant sensor adjacent to but not in contact with the shaft surface. The shaft was rotated about its axis with a constant applied torque. Three different torque values were used. The measurements were taken one orientation at a time.

Sensor 50x is oriented in the axial direction (x-axis) also referred to as the in-line direction. Measurements of the magnetic field Bx parallel to the axis (the in-line field) as a function of x were made. The sensor was moved in the axial (x)-direction to obtain the field profile of FIG. 10.

Sensor 50y is oriented radially of the shaft axis A—A to provide a measurement of radial field $B_y$. It is also moved in the axial (x) direction to provide a profile of the radial field $B_y$ as a function of x at a constant radius. This profile is seen in FIG. 11.

Sensor 50z is oriented tangentially of the shaft to respond to the circumferential or tangential field $B_z$. It is also moved in the axial (x) direction to provide a profile of the tangential field $B_y$ as a function of x at a constant radial distance from the shaft. This profile is seen in FIG. 12.

The axial field, radial field and tangential field profiles given in the curves of FIGS. 9a–9c respectively will now be further discussed. Each profile was obtained by means of the same sensor oriented in the appropriate 50x, 50y, 50z position.

FIG. 10 shows three profiles of a shaft magnetised by the procedure described above with a sensor $50_x$ mounted at 2.5 mm. from the shaft surface. The shaft is run at 2800 rpm and profiles were taken at torque values of 0 (zero), +80 and −80 Nm. The abscissa axis of the graph is the x distance from the axial centre 28 of the transducer. The ordinate axis is an output signal value in mV representing the sensed field. The output shows an offset. The ordinate zero is at about 2300 mV. The profile obtained is of similar shape for all three torques but it is seen that the profile shifts axially with torque. The zero torque curve peaks at the centre line 28. The peaks for the +80 and −80 Nm curves have the same peak magnitude as the zero torque curve but are shifted to opposite sides of the centre. Thus a torque causes an axial shift in the axial field $B_x$ the magnitude of which shift is a function of torque and the polarity of which is dependent on the polarity of the applied torque.

FIG. 10 also exhibits some other characteristics of interest. The measured $B_x$ field enters a region of opposite polarity adjacent the poles of region 22 before dropping towards zero as the sensor is moved away from the poles. The change in polarity is explained below with reference to FIGS. 13 and 14. The poles are at about ±15 mm. from the transducer centre line 28. The measured field polarity is in the same sense at the two pole regions but exhibits a torque-dependent differential in amplitude. It will be seen that as compared with the zero torque curve, which is near symmetrical about the x=0 point, the output measured in the region adjacent one pole (at about 15 mm. distance) is enhanced for one polarity of torque and decreased for the other polarity of torque but the enhancements/decreases are of opposite sense in the pole regions. It may be surmised that the axial field is the being tilted from one pole towards the other with the direction of tilt dependent on torque.

Another characteristic, which appears also in FIGS. 11 and 12, is that there appear to be points P adjacent but just axially outside the poles through which the curves all pass. These are referred to herein as pivotal points.

FIG. 11 is a similarly produced magnetic field profile, in this case for the radial field $B_y$. The sensor $50_y$ is mounted at 2.5 mm. from the shaft surface.

In FIG. 11 the output values in mV are also shown with an offset. The ordinate zero is at 2500 mV. Looking at the 0 (zero) Nm curve, it reaches the same peak magnitude at each pole region but the signal polarities are opposite. Between the two regions is a smooth variation passing through zero at X=0 (allowing for experimental error). The ±80 Nm curves show the same characteristics as was exhibited in the axial field measurement. They are x-shifted with respect to the zero torque curve. At one pole region the peak of one has increased and the other decreased relative to the zero torque curve and the sense of the increase/decrease is opposite at the two pole regions. This again appears to be consistent with a tilting of the magnetic field pattern dependent on the polarity of the applied torque. The curves all come together at pivotal points or small regions P just beyond the poles.

Finally FIG. 12 illustrates that the magnetisation produced in the shaft has essentially no circumferential or tangential component $B_z$ at any value of X.

Without attempting to theorize about the nature of the torque-dependent magnetic field emanated by the transducer element 22 (the "tilt" concept is put forward as a possible effect on the field), it can be seen that both the axial field and radial field provide the potential for a magnetic-based transducer system for measuring torque. In particular the parallel straight line regions each side of the abscissa zero in FIG. 10 may be utilised for torque measurement. It has been found that within elastic limits a linear relationship between torque and magnetic output exits. Similarly the parallel straight line region extending about the abscissa zero in FIG. 11 may be used. It also provides a linear relationship between torque and magnetic output.

Figure 13:
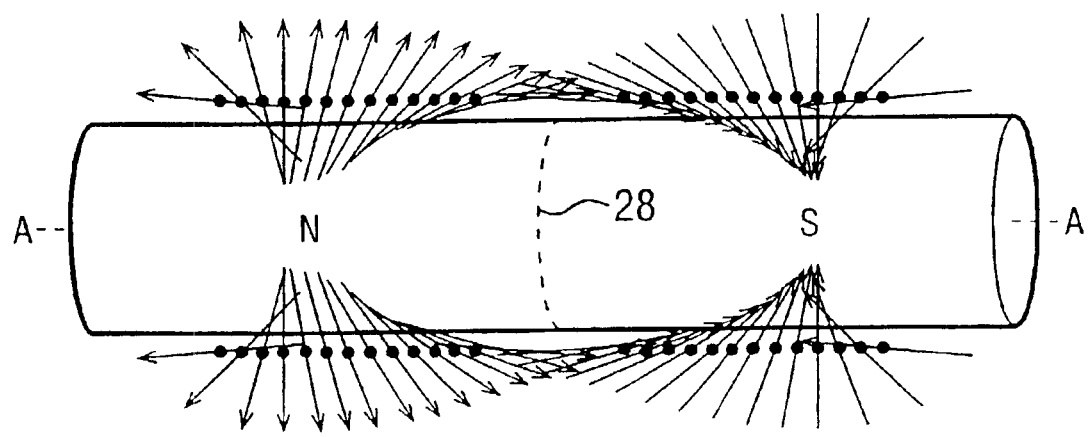
FIG. 13 is an explanatory diagram of magnetic flux direction in the vicinity of the transducer element.

In considering the results demonstrated by the curves of FIGS. 10 and 11, reference is made firstly to FIG. 13. This illustrates the magnetic flux direction represented by vector arrows measured adjacent the is surface of the sensor host (2 mm. from the shaft surface). Each spot or dot indicates an axial measurement point and each vector arrow through the spot indicates the direction of the flux at that point, though not its relative magnitude. The measurements extend over and just beyond the magnetised portion of the shaft. The poles lie in the regions marked N and S. The shaft has zero applied torque (or any other force).

The field is essentially axially directed at the centre line 28, becomes increasingly radial moving towards the poles, the radial component peaking adjacent the pole regions with zero axial component. Moving further beyond the poles the radial component decreases and the axial component increases but now in the opposite sense to that at the centre line. It must be borne in mind that FIG. 13 is concerned only with direction not with magnitude. It is considered that the vector distribution shown in FIG. 13 is consistent with the measured magnitude distributions for zero torque of FIGS. 10 and 11.

Figure 14A:
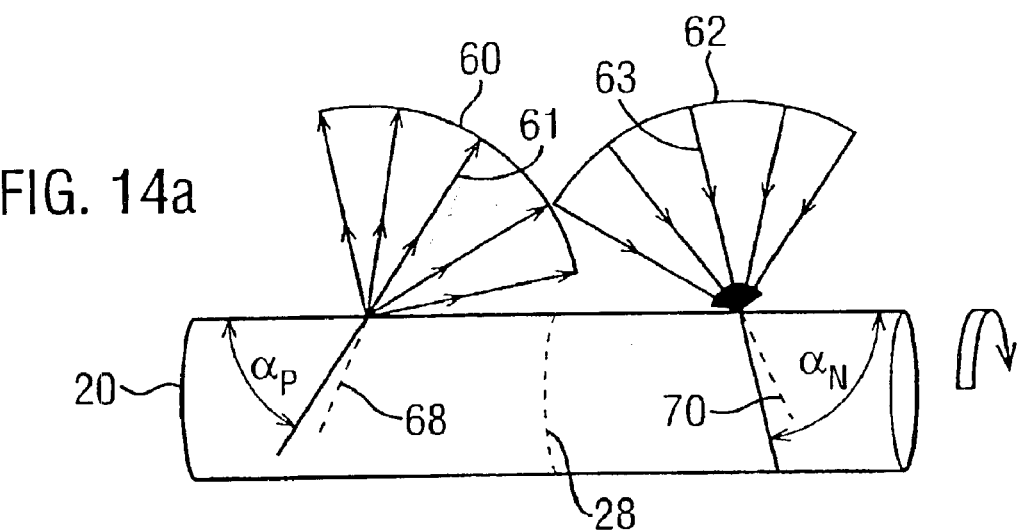
FIGS. 14a to 14c are explanatory diagrams relating to the effect of torque on the magnetic field distribution.
Figure 14B:
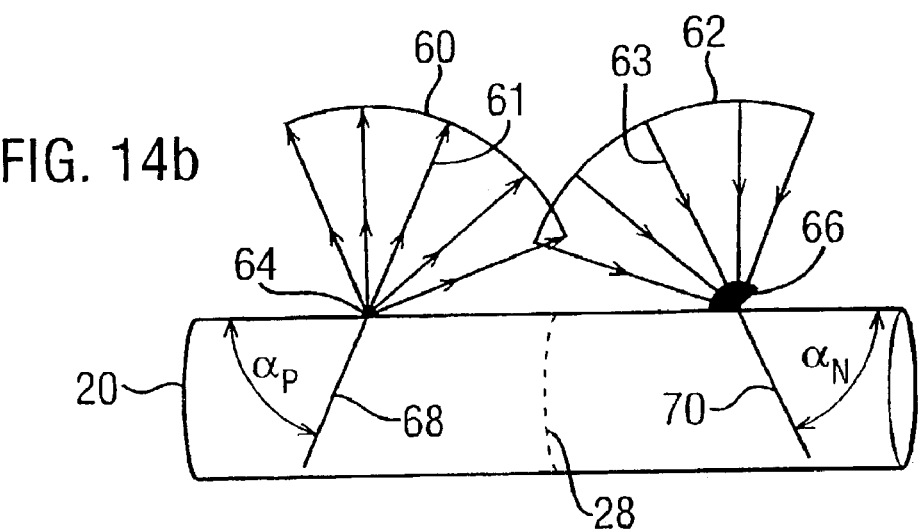
Figure 14C:
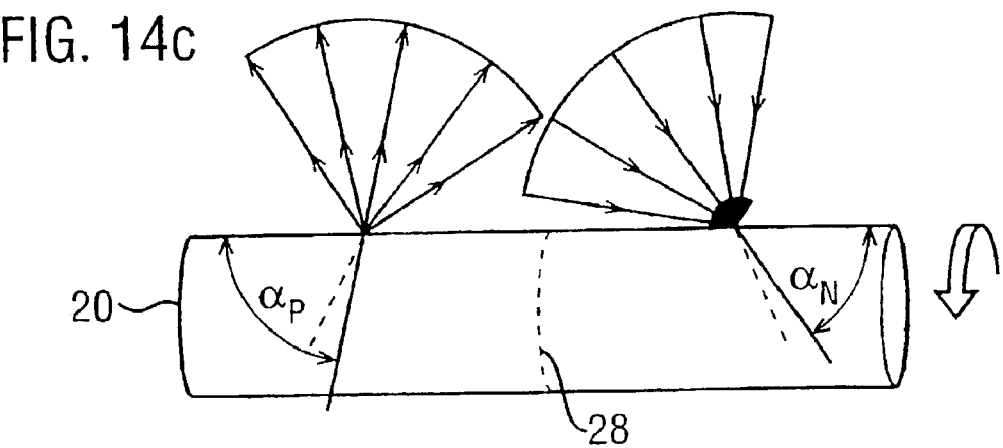

FIGS. 14a to 14c show a simplified magnetic model relating to the "tilt" concept already mentioned in regard to the change in the axial and radial field distributions under torque. FIGS. 14a–c show fields relating to torque applied in one sense (say cw), zero torque and torque applied in the other sense (ccw) respectively.

Looking first at FIG. 14b, there are shown fans 60 and 62 of magnetic flux lines taken as emanating from points 64 and 66 adjacent the poles of magnetised region 22 of the shaft. The directions of the flux lines are represented by the arrows. The magnitude of the field is not indicated. The angle of the fans is expressed with respect to a datum 68 and 70 respectively. In FIG. 14b each datum is aligned with the central arrow 61, 63 of the respective fan. Under cw torque in FIG. 14a the fans "roll" about points 64 and 66. Under no torque the two fans aligned with the datums are at the same angle (though pointing in opposite directions) to the surface of the shaft, i.e. αp=αn. Under torque they roll in the same direction so that the projected lines of the arrows 61, 63 shifts with respect to the datums 68, 70. If the angles are taken with reference to the surface of the shaft 20, the angle of αp of fan 60 decreases while the angle αn of fan 62 increases for cw torque in FIG. 14a. The converse occurs when the torque is applied in the ccw direction as illustrated in FIG. 14c.

Figure 15A:
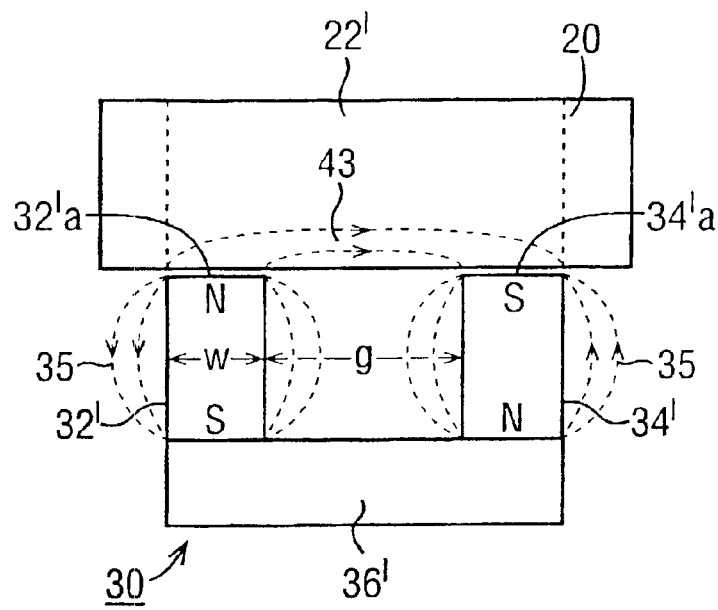
FIGS. 15a and 15b are diagrammatic illustrations for purposes of explanation of magnetic fields established in a transducer region by a magnetic source, FIG. 15b relating to the practice of the invention as shown in FIGS. 4 and 7.
Figure 15B:
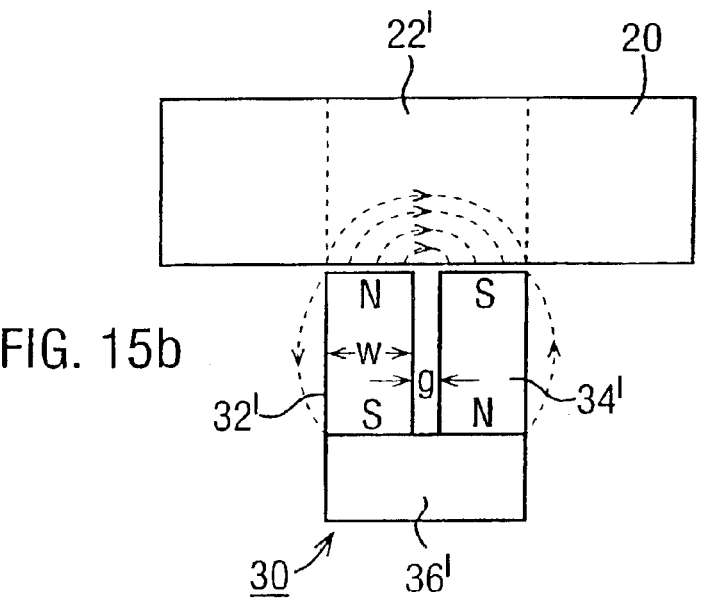

Details of a particular magnet configuration acting as a magnetic source have been given above with reference to FIGS. 4 and 5. Further explanation of the creation of the magnetised region within the shaft was given with reference to FIG. 7 and FIGS. 8a–8c. The magnetic source 30 in FIG. 7 is of a similar configuration to that seen in FIG. 4 to create a transducer element which provides an external magnetic field having the profile characteristics described above. Some further aspects of the parameters of the desired magnetic pole configuration will now be discussed with reference to FIGS. 15a and 15b which contrast a configuration in FIG. 15a, which as best presently understood does not lead to a degree of magnetisation and a field sufficient for the present invention, with a configuration in FIG. 15b which does produce the desired external field. Referring to FIG. 15a it shows a magnetic source 30 comprising magnets 32' and 34' oppositely poled with respect to the region 22' of a shaft 20 that is to be magnetised to provide a transducer element. The magnets 32' and 34' are linked by a flux concentrator 36' to provide a U-shape magnet acting on the shaft 20. What is different about the assembly of FIG. 15a is the relatively wide gap g between the poles and particularly the pole ends 32'a and 34'a. Each magnet 32 and 34 tends to form a magnetic field 35 about itself the flux in which does not contribute to the flux available to enter and magnetise shaft portion 22' to remanance magnetisation. Furthermore the flux which does find a path through the portion 22 tends to be concentrated near the surface in a surface-adjacent zone 43. As the magnets 32' and 34' are brought nearer together (g is reduced) the flux 35 linked about each individual magnet reduces and more flux is concentrated in the portion 22' as seen in FIG. 15b and to a greater depth. This is the situation seen in FIG. 4 and FIGS. 7 and 8a–8d in which in FIGS. 4 and 7 the arrowed loops indicate the flux circulating through the magnet assembly and the adjacent portion 22' of the shaft 20. In addition the depth of magnetisation within the portion 22' is enhanced by having relatively wide (w) pole ends 32'a and 34'a. A ratio of w/g of about 7 or greater appears satisfactory.

Electromagnet Alternative

The permanent magnet assemblies so far discussed have the advantage that very high magnetic field strengths can be achieved with reasonably small dimensions. They do, however, have the disadvantage that their field strength cannot be easily altered nor can they be switched off. As an alternative an electromagnet assembly energised with direct current (D.C.) can be used as a magnetic source for the magnetic programming of the sensor host. Because of the control possible with electromagnets it becomes possible or more readily possible to match the field strength between magnets to achieve the desired sensor performance: to adjust the effective field strength between the magnet assembly and sensor host to improve significantly the rotational uniformity of the measurement signal: to adjust the desired full scale measurement range: to quicken the programming process, particularly in the withdrawal or retraction phase of Step 3) above. The electromagnet does not necessarily have to be withdrawn from the sensor host in Step 3) or advanced toward it in Step 1), but the procedure of steps 1) to 3) can be emulated by controlling the electromagnet current. Step 1) can be implemented by ramping up or increasing the energising current while the effect of the MPU retraction is obtainable by reducing or ramping down the energising current for the electromagnet. A combination of movement and current control may be employed.

The maximum flux density achievable in electromagnets is less than that in permanent magnets so that for a given usable field strength in the sensor host an electromagnet system will be physically larger than a permanent magnet one.

Pre-Magnetisation Procedure

The pre-magnetisation process for the sensor host will now be described, specifically in relation to demagnetising or de-gaussing a shaft. This procedure is important to obtaining the field distribution characteristics described above. The shaft as received may have been subject to various mechanical and/or heat treatment operations which differentially affect the magnetic domains within the material. It may have been subject to and have acquired undefined magnetic fields. Such unknowns will be deleterious to transducer performance. Thus in most cases the shaft is to be put through a pre-magnetisation procedure to put it into a magnetically-defined state which has been referred to above as magnetically cleansed.

The degree of demagnetisation required is partially dependent on the magnetisation to be applied thereafter. For example if the magnetic programming to create the transducer element uses a relatively low level of magnetic field strength, the more important it becomes to completely demagnetise the sensor host. In this context magnetic cleansing means that the de-gaussing or demagnetisation procedure results in that the magnetic direction of the individual grains of the shaft material is random so that no grouping of magnetic domains in any particular direction exists. The existence of magnetic domain grouping to provide some organised magnetic orientation of individual grains leads to deficiencies in the magnetised transducer element. For example, increased offsets of the measured magnetic signal; non-uniformity of the signal as a function of the rotational angle of the shaft; and lower stability over time of the transducer element.

The magnetic cleansing should extend well beyond the region at which the magnetised transducer element is to be formed, e.g. preferably the whole shaft should be demagnetised so that there are no undefined local magnet systems in the sensor host. In particular "bar-magnet" formations parallel to the shaft axis may travel over time within the shaft to affect the sensor specification on any ongoing basis.

Figure 16:
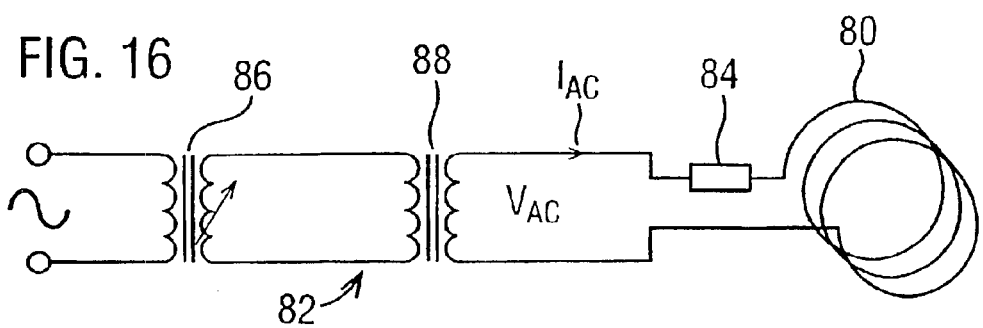
FIG. 16 is a circuit diagram of apparatus for use in a pre-magnetisation and post magnetisation procedure for a shaft.

FIG. 16 illustrates an apparatus for magnetic cleansing. It comprises a demagnetising coil 80 would in hollow solenoid fashion, a mains powered transformer arrangement 82 and a current limiter 84. For an 18 mm. diameter shaft a suitable coil was about 300 turns off about 30 cm. diameter of a heavy current carrying capacity cable. The outer conductor of a heavy coaxial cable coiled into a solenoid coil proved to be suitable. The transformer arrangement 82 comprises a variable transformer 86 connected to a 110 or 240 VAC mains AC supply. This is in turn connected to an isolation transformer 88 capable of safely delivering 10 amperes or more at its secondary at voltages at up to say 48V. The coil 80 is connected to the secondary of transformer 88 through the current limiter 84 which may be a resistor, e.g. a power rheostat, or more elaborate electronic device. The current limiter may be omitted provided steps are taken to monitor the current through the coil. A typical coil resistance would be about 100 milliohms. The variability of the transformer arrangement enables the current to be controlled as desired.

The coil 80 is energised and the full length of the shaft is passed through the coil while the coil is energised at 8–10A This produces a de-gaussing field of is about 1 kGauss. Typically one is looking to achieve fields in the 500–1200 Gauss range. The shaft may be mounted on a movable jig to move it along the axis of the coil and the movement continues as the far end of the shaft leaves the coil so that the field to which the shaft is subjected gradually decreases. There may be other ways of achieving the de-gaussing procedure including control of the coil current as a function of the axial position of the shaft with respect to the coil.

This pre-magnetisation is considered to have more general applicability to a wide range of sensor host shapes (shafts, discs etc.) and to a wide range of magnetic transducer types, including circumferentially-magnetised.

Post-Magnetisation Procedure

The optional Step 4) of a post-magnetisation step following the magnetisation procedure described above is performed in the same manner as the pre-magnetisation procedure but at a lower level of magnetic field. This step may also be applied more generally to stabilise sensor hosts magnetised in other ways such as set out above.

In the post-magnetisation procedure of Step 4), the magnetised shaft is again passed axially through the energised solenoid coil 80. However, the AC current through the coil is of an order of a magnitude lower than for the pre-magnetisation procedure. In the pre-magnetisation example given above, the 8–10A current employed for pre-magnetisation is reduced to say 0.5–1A for post magnetisation. The current is at a value which does not change the basic magnetic pattern sought to be established but, as best can be surmised, it reduces or knocks-back parasitic fields that may be present after the magnetisation proceedings. It has been found that the post-magnetisation step improves the uniformity of the output signal with rotation of the shaft, offsets over time and the final sensor stability generally.

Reverting to the magnetisation procedure and particularly to Step 2) of it, it has already been mentioned that the distance $D_2$ (FIG. 6b) should be kept as small as possible. Actual contact with the shaft surface should be avoided. Furthermore, the distortions should be kept constant as small variations can greatly influence the flux which enters the sensor host. For example, a position control feedback system based on a laser distance sensor acting between the MPU 30 and the shaft surface can be employed. Such a system will be usable on shafts of non-circular cross-section. The field between the MPU poles and the surface of the sensor host is very large typically in the region of the ±1 kGauss to ±6 kGauss.

During the magnetisation procedure, particularly Step 2), the magnetisation achieved can be measured, for example at a point remote from the MPU 30, e.g. the is opposite side of the shaft. an independent sensor device is set up at this point to measure an external field that can be correlated with the internal stored field. The magnetisation procedure can continue until some wanted sensed field is obtained. Programming by means of an electromagnet system is advantageous here in the greater control that can be exercised.

The magnetisation level in the sensor can be monitored in real time and the electromagnet current adjusted accordingly. An alternative is a stepwise approach in which the electromagnet current is set to a given magnetisation level; the electromagnet is switch off while a monitoring measurement is made; and the electromagnet is re-energised for a lower or higher level of magnetisation dependent on the measurement. The monitoring measurement and re-magnetisation steps can be repeated until the desired result is achieved.

The real time and stepwise procedures apply in the theory to the use of permanent magnets by adjustment of position but the degree of control required is more difficult to realise.

Torque Measurement Systems

The following description is concerned with the implementation of torque measurement systems based on the curves of FIGS. 10 and 11, and particularly the straight line regions of them previously noted.

Figure 18:
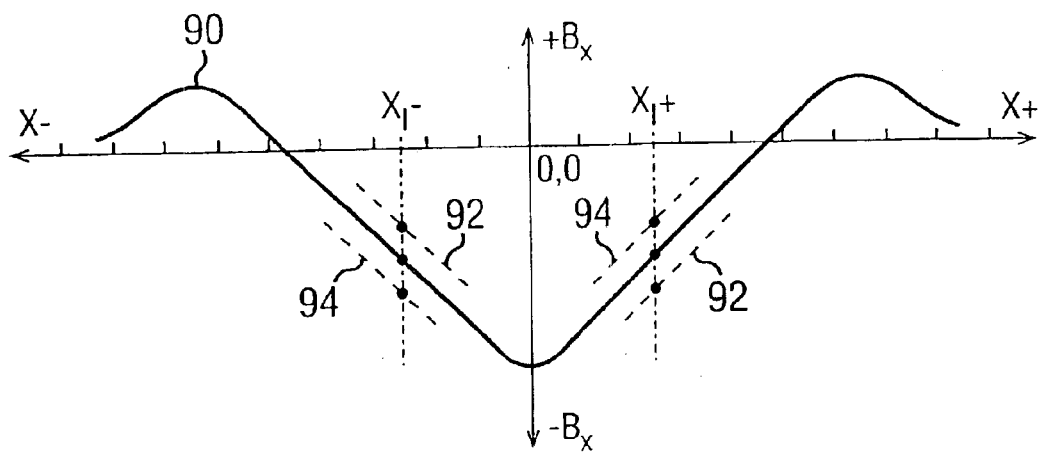
FIG. 18 is a generalised representation of the curves of FIG. 10.

FIG. 18 is a generalised representation of the axial profile curves of FIG. 10 (the polarity is reversed) in which 90 indicates the zero torque curve and 92 and 94 are relevant segments of the torque shifted curves resulting from opposite directions of torque. A sensor or array of sensors is placed in non-contacting position closely adjacent the shaft at axial positions such as $X_1+$ and $X_1-$ in the regions where the curve segments are parallel and most nearly linear. The sensors are oriented axially. Linearity of field strength with axial position at a given torque is not essential but is desirable and aids in calibration and calculation of torque values. It will be seen that a sensor placed at $X_1+$ or $X_1-$ will produce a signal representing $B_x$ that is a function of torque. The output at $X_1+$ is of opposite sign to that at $X_1-$. A sensor can be placed at each of the two positions and the signals combined to add together. This is further described below with reference to FIG. 23.

Figure 19:
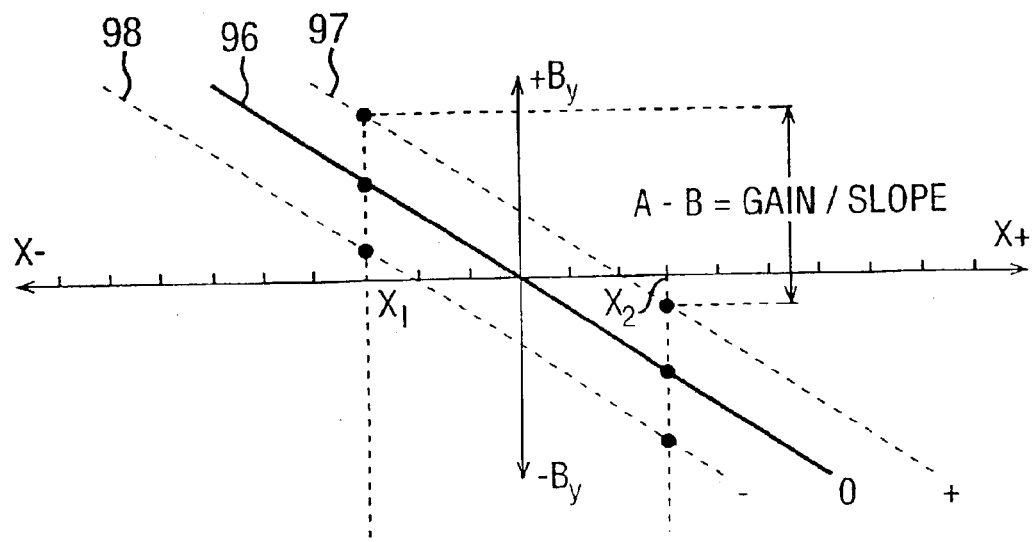
FIG. 19 is a generalised representation of the curves of FIG. 11.
Figure 20:
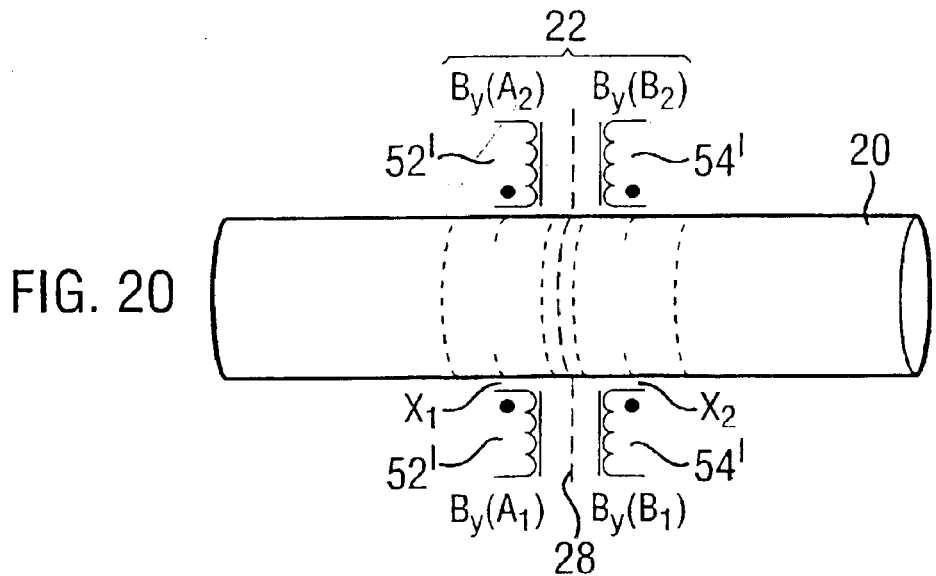
FIG. 20 shows sensor pairs for radial field measurement on the basis of FIG. 19.
Figure 21:
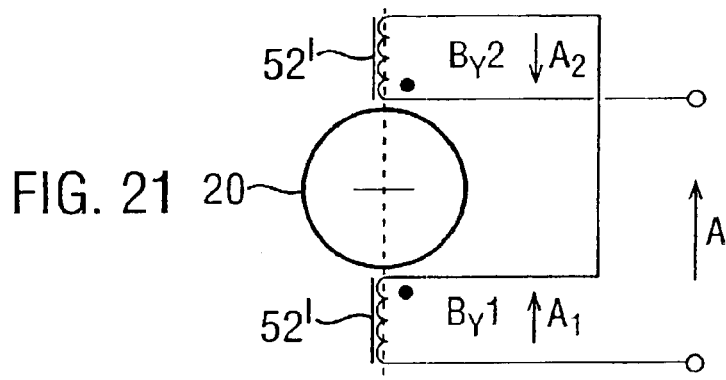
FIG. 21 shows the arrangement of one sensor pair.

The radial case is illustrated in FIG. 19 which is the central section of the curves of FIG. 11 (the polarity is reversed). 96 indicates the zero torque curve going through the origin region, and 97 and 98 relevant torque shifted segments. This is exploited as shown in FIG. 20. Single sensors or preferably opposed pairs 52', 54' of sensors are placed to each side of the centre line of the transducer element (the magnetised portion 22 of shaft 20) at positions such as $X_1$ and $X_2$, preferably of equal X magnitude from the centre plane 28. FIG. 21 shows the advantage of an opposed pair of sensors (e.g. 52') which are radially oriented and diametrically opposite. The sensor pair are connected to additively combine their opposite polarity outputs $A_1$ and $A_2$ to provide a combined signal $A=A_1+A_2$. However, common mode effects such as the Earth's magnetic field are cancelled. The outputs from the other pair of sensors are treated in the same way to obtain a combined output signal $B=B_1+B_2$.

FIG. 19 shows that the value A−B remains constant at all torque levels and represents the $B_y$ v. X slope of the curves and thus can be expressed as a "gain" factor for the transducer element. A or B or (A+B) is a torque dependent output function.

Figure 22:
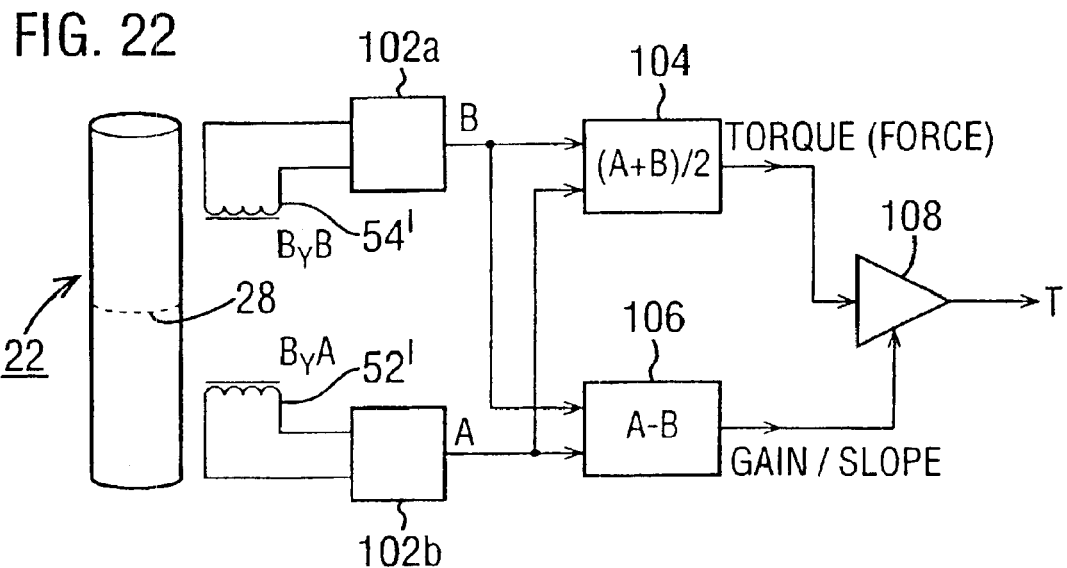
FIG. 22 shows a circuit for obtaining a gain compensated torque output signal.

FIG. 22 is a circuit diagram illustrating how these signals can be used to provide a torque output signal which is compensated for changes in the gain factor. In FIG. 21 the sensor signals A and B from the transducer element portion 22 are appropriately derived as by using the circuitry 102a, 102b, as described in WO98/52063. The two signals are applied to sum and difference units 104 and 106 respectively. The sum signal (A+B)/2 is then applied as an input to a gain-controllable amplifier 108 to which the different unit output (A−B) is applied as a gain control signal. The output T of the amplifier 108 is a torque signal T compensated for changes in the gain factor.

Figure 23:
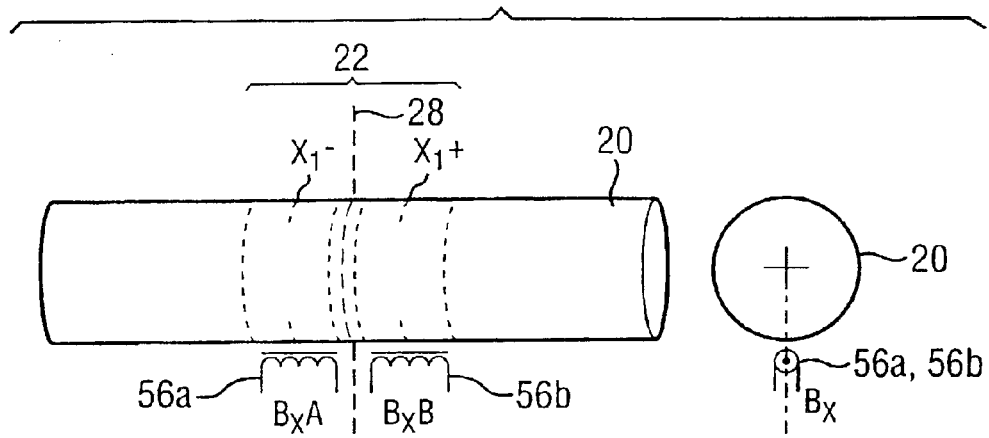
FIG. 23 shows the placing of a pair of axially oriented sensors on the basis of FIG. 18.

Reverting to the axial field distribution of FIGS. 10 and 18, FIG. 23 shows a pair of axially oriented sensors 56a, 56b located adjacent the magnetised transducer region of a shaft at positions such as $X_1-$ and $X_1+$ in FIG. 18. The two sensors can be connected to measure torque (A+B)=A−(−B) and gain or slope A−B=A+(−B).

Guard/Keeper Field Regions

Figure 25:
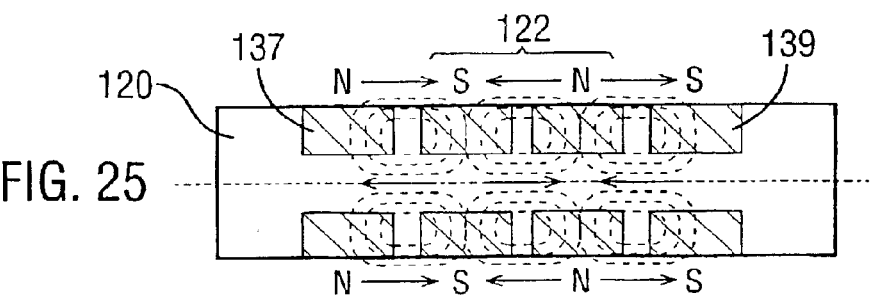
FIG. 25 shows diagrammatically the resultant fields in a shaft.

Mention has been made above of the provision of guard or keeper fields for the transducer element region. FIGS. 24 and 25 illustrate how this may be done. FIG. 24 generally follows FIG. 4 but the magnet system 130 of FIG. 24 is extended by two further poles. There are four radial magnets of alternating polarity along and adjacent a shaft 120 and having a common extended flux concentrator 136. The magnetisation procedure follows the steps of FIGS. 6a–6c and is preceded and succeeded respectively by the pre-magnetisation and post magnetisation operations already described.

The magnets 132 and 134 act together to provide the magnetised region 122 for use as the transducer element. This has the external flux 140. One outer magnet 133 coacts with magnet 132 to provide a magnetised region sharing one magnet (S) of portion 122 and a further opposite polarity (N) closely adjacent to it axially. These poles are linked by flux 140' which is not used in measurement. The other outer magnet 135 similarly coacts with magnet 134 to provide a magnetised region sharing one pole (N) of portion 122 and a further opposite polarity pole (S) closely adjacent to it axially. The resultant closed loop magnetic flux patterns are shown in fine dash line in FIG. 25. The two outer keeper or guard regions 137, 139 act to prevent leaching of the active transducer region 122 and prevent unwanted fields invading region 122 along the shaft, and to generally assist in stabilising the properties of the desired transducer region. Guard regions for preventing unwanted fields invading region 122 need not be longitudinally magnetised. They may have other forms of defined magnetisation such as that known as circumferential or circular magnetisation as described in the PCT application published under the number WO99/56099.

The foregoing description has been in terms of magnetising a portion of a shaft for torque measurement. The magnetisation described may be also applied to a transducer element in an elongate member—for which the term "shaft" may be generically used—subject to flexure, that is to bending forces. In this case a transducer arrangement of the kind described is used to measure applied force.

What is claimed is:

1. A magnetic transducer element comprising:
    a member of magnetisable material having an axis about which it is subjectable to torque or is capable of flexing;
    said member being remanently magnetised to have an annulus of axially-directed magnetisation about said axis, said annulus of magnetisation emanating an external magnetic field that exhibits
    a) no significant component of circumferentially (tangentially)-directed magnetic flux (with respect to said axis) externally of said member when the member is subject to torque applied thereto about said axis and/or to a force causing the member to flex about said axis, and
    b) a significant component which is other than circumferentially (tangentially)-directed and which varies as a function of torque or of flexing of the member about said axis.

2. A magnetic transducer element as claimed in claim 1 in which said annulus of axially-directed magnetisation extends inwardly from an external surface of said member.

3. A magnetic transducer element as claimed in claim 1 in which said member is an integral portion of a shaft (which term includes elongate members in general in respect of flexing) subject to torque or to flexing and in which said member is free of resident magnetic fields other than said annulus of magnetisation and said shaft is free of parasitic fields in the vicinity of said member.

4. A magnetic transducer element as claimed in claim 1 in which said annulus of magnetisation forms a closed loop of magnetic field extending in a flux path which is interior to said annulus.

5. A magnetic transducer element as claimed in claim 2 in which the radial depth of the annulus of saturated magnetisation is between 30 and 60% of the radius between the axis and said surface.

6. A magnetic transducer element as claimed in claim 1 in which the external field emanated by said member has a distribution in the direction of said axis, the axially-directed component of which distribution shifts in the axial direction as a function of torque over at least a portion of the emanated field distribution.

7. A magnetic torque transducer element as claimed in claim 1 in which the external field emanated by said member has a distribution in the direction of said axis, the radial component of which distribution shifts in the axial direction as a function of torque over at least of portion of the emanated field distribution.

8. A magnetic transducer element comprising:
a member of magnetisable material having an axis about which it is subjectable to torque or is capable of flexing;
said member being magnetised to have an annulus of axially-directed magnetisation about said axis having poles of opposite polarity, said annulus of magnetisation providing an axiallydirected magnetic field externally of said member, said magnetic field having a distribution in the direction of said axis, at least a component of which shifts in the axial direction when the member is subject to torque applied thereto about said axis.

9. A magnetic transducer element as claimed in claim 8 in which said annulus of axiallydirected magnetisation extends inwardly from an external surface of said member.

10. A magnetic transducer element as claimed in claim 8 in which said component is an axially-directed component of said distribution.

11. A magnetic transducer element as claimed in claim 8 in which said component is a radial component of said distribution.

12. A magnetic transducer element as claimed in claim 8 in which an axially-directed component and a radially-directed component shift of said distribution in the axial direction when the member is subject to torque.

13. A magnetic transducer element as claimed in claim 6 wherein the distribution of said field has pivotal points or regions at or axially beyond the poles of said member through which the axial or radial components, as the case may be, pass irrespective of the torque-dependent axial shift.

14. A transducer arrangement comprising a magnetic transducer element as claimed in claim 1 and at least one magnetic field sensor located adjacent said annulus of magnetisation to sense the field emanated by said element.

15. A transducer arrangement as claimed in claim 14 in which said at least one magnetic field sensor has a direction of minimum response in the circumferential or tangential direction.

16. A transducer arrangement as claimed in claim 15 in which said at least one magnetic field sensor has an axis of maximum response which lies in an axial direction to detect an axially-directed component or a radial direction to detect a radially-directed component of the emanated field.

17. A transducer arrangement as claimed in claim 16 in which the axis of maximum response is in a radial direction and said at least one magnetic field sensor is located in alignment with or in the vicinity of the plane normal to said axis of said annulus of magnetisation that is axially centred with respect to said annulus.

18. A transducer arrangement as claimed in claim 16 in which the axis of maximum response is in an axial direction and said at least one magnetic field sensor is axially located to one side of the plane normal to said axis of said annulus of magnetisation that is axially centred with respect to said annulus.

19. A transducer arrangement as claimed in claim 18 wherein there are at least two magnetic field sensors the axis of maximum response of each of which is in an axial direction and at least one magnetic field sensor is located to one side of said plane.

* * * * *